United States Patent
Brodsky et al.

(10) Patent No.: US 8,473,915 B2
(45) Date of Patent: Jun. 25, 2013

(54) COVERAGE ANALYSIS TOOL FOR TESTING DATABASE-AWARE SOFTWARE APPLICATIONS

(75) Inventors: Stephen Andrew Brodsky, Los Gatos, CA (US); Anshul Dawra, San Jose, CA (US); Swaminathan Gounder, San Jose, CA (US); Brandon Wirick, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1479 days.

(21) Appl. No.: 11/833,809

(22) Filed: Aug. 3, 2007

(65) Prior Publication Data

US 2009/0037893 A1 Feb. 5, 2009

(51) Int. Cl.
*G06F 9/44* (2006.01)
*G06F 9/45* (2006.01)

(52) U.S. Cl.
USPC .......................... 717/124; 717/127; 707/713

(58) Field of Classification Search
USPC ........... 717/124–129; 707/705, 713, 718–719
See application file for complete search history.

(56) References Cited

U.S. PATENT DOCUMENTS

| | | | |
|---|---|---|---|
| 5,230,049 A | 7/1993 | Chang et al. | |
| 5,640,550 A | 6/1997 | Coker | |
| 5,701,471 A * | 12/1997 | Subramanyam | 717/124 |
| 5,717,911 A | 2/1998 | Madrid et al. | |
| 5,737,609 A * | 4/1998 | Reed et al. | 717/126 |
| 5,898,838 A | 4/1999 | Wagner | |
| 6,071,317 A * | 6/2000 | Nagel | 717/128 |
| 6,108,660 A | 8/2000 | Ikeda et al. | |
| 6,138,112 A * | 10/2000 | Slutz | 707/748 |
| 6,286,131 B1 * | 9/2001 | Beers et al. | 717/125 |
| 6,311,327 B1 | 10/2001 | O'Brien et al. | |
| 6,341,288 B1 | 1/2002 | Yach et al. | |
| 6,378,126 B2 | 4/2002 | Tang | |
| 6,560,592 B1 | 5/2003 | Reid et al. | |
| 6,581,052 B1 * | 6/2003 | Slutz | 1/1 |
| 6,658,429 B2 * | 12/2003 | Dorsett, Jr. | 707/708 |
| 6,877,000 B2 | 4/2005 | Gajda et al. | |
| 6,907,546 B1 * | 6/2005 | Haswell et al. | 714/38 |
| 6,978,261 B2 | 12/2005 | Cotner et al. | |
| 7,062,757 B2 * | 6/2006 | Honarvar et al. | 717/127 |
| 7,110,991 B2 | 9/2006 | Arnold et al. | |
| 7,185,000 B1 * | 2/2007 | Brown et al. | 707/718 |
| 7,200,595 B2 | 4/2007 | Dutta et al. | |
| 7,203,928 B2 * | 4/2007 | Mandava et al. | 717/124 |
| 7,299,452 B1 * | 11/2007 | Zhang et al. | 717/124 |
| 7,305,659 B2 * | 12/2007 | Muller et al. | 717/127 |
| 7,343,586 B1 * | 3/2008 | Hernandez, III | 717/124 |
| 7,451,455 B1 * | 11/2008 | El-Haj | 719/320 |
| 7,490,319 B2 * | 2/2009 | Blackwell et al. | 717/124 |

(Continued)

OTHER PUBLICATIONS

Leow et al, "Automated generation of test programs from closed specifications of classes and test cases", IEEE ICSE, pp. 1-10, 2004.*

(Continued)

*Primary Examiner* — Anil Khatri
(74) *Attorney, Agent, or Firm* — Patterson & Sheridan, LLP (57) ABSTRACT

Embodiments of the invention provide coverage analysis of database elements accessed by a software application, thus providing improved and more complete testing of database-aware applications. In one embodiment, database elements accessed by the software application are determined during a run-time test of the software application.

22 Claims, 5 Drawing Sheets

U.S. PATENT DOCUMENTS

| | | | | |
|---|---|---|---|---|
| 7,506,315 | B1 * | 3/2009 | Kabadiyski et al. | 717/128 |
| 7,577,681 | B1 | 8/2009 | Rozenman et al. | |
| 7,603,658 | B2 * | 10/2009 | Subramanian et al. | 717/126 |
| 7,650,594 | B2 * | 1/2010 | Nattinger | 717/125 |
| 7,664,989 | B2 * | 2/2010 | Joshi et al. | 714/38 |
| 7,676,794 | B2 * | 3/2010 | Akiyama et al. | 717/127 |
| 7,711,746 | B2 | 5/2010 | Bernal et al. | |
| 7,757,175 | B2 * | 7/2010 | Miller | 715/738 |
| 7,774,757 | B1 * | 8/2010 | Awasthi et al. | 717/127 |
| 7,814,042 | B2 * | 10/2010 | Ahmed | 707/719 |
| 7,823,135 | B2 * | 10/2010 | Horning et al. | 717/127 |
| 7,836,346 | B1 * | 11/2010 | Davidov et al. | 714/38 |
| 7,865,502 | B2 * | 1/2011 | Balmin et al. | 707/713 |
| 7,979,410 | B2 * | 7/2011 | Pattabhi et al. | 707/705 |
| 7,984,031 | B2 * | 7/2011 | Chordia et al. | 707/705 |
| 8,006,233 | B2 * | 8/2011 | Centonze et al. | 717/126 |
| 8,024,320 | B1 * | 9/2011 | Yehuda et al. | 707/713 |
| 8,032,863 | B2 * | 10/2011 | Kolawa et al. | 717/124 |
| 8,078,609 | B2 * | 12/2011 | Black | 707/713 |
| 8,196,105 | B2 * | 6/2012 | Singhal et al. | 717/124 |
| 2003/0041052 | A1 | 2/2003 | Gajda et al. | |
| 2003/0084425 | A1 | 5/2003 | Glaser | |
| 2004/0107415 | A1 | 6/2004 | Melamed et al. | |
| 2004/0193567 | A1 | 9/2004 | Dettinger et al. | |
| 2004/0205691 | A1 | 10/2004 | Poole et al. | |
| 2005/0027701 | A1 | 2/2005 | Zane et al. | |
| 2005/0160322 | A1 | 7/2005 | West et al. | |
| 2006/0222160 | A1 | 10/2006 | Bank et al. | |
| 2007/0022480 | A1 | 1/2007 | Newman | |
| 2007/0067350 | A1 | 3/2007 | Dinh et al. | |
| 2008/0140696 | A1 | 6/2008 | Mathuria | |

OTHER PUBLICATIONS

Tongrak et al, "A tool for generating test case from relational database constraints testing", IEEE, pp. 435-439, 2009.*

Whiting et al, "Creating realistic scenario based synthetic data for test and evaluation of information analytic software", ACM BELIV, pp. 1-9, 2008.*

Sakurai et al, "Test based pointcuts A robust pointcut mechanism based on unit test case for software evolution", ACM Workshop LATE, 2007.*

Carlos et al, "A strategy for evaluating feasible and unfeasible test cases for the evolutionary testing of object oriented software", ACM AST, pp. 85-92, 2008.*

Tsui et al, "Analysis of software cohesion attribute and test case development complexity", ACM pp. 237-242, 2011.*

Michael Martin et al., "Finding Application Errors and Security Flaws Using PQL: a Program Query Language," OOPSLA, 2005, pp. 365-383.

Vinayak Borkar et al., "Query Processing in the AquaLogic Data Services Platform," VLDB, 2006, pp. 1037-1048.

Ramkrishna Chatterjee et al., "Using Applications of Data Versioning in Database Application Development," Proceedings of the 26th International Conference on Software Engineering, 2004, pp. 1-16.

U.S. Appl. No. 11/833,665, entitled "Displaying and Refactoring Programs That Include Database Statements" by A. Ahadian et al., filed Aug. 3, 2007.

George Reese, Chapter 4: Database Access Through JDBC, Database Programming with JDBC and Java, 1st Edition, Jun. 1997, ISBN 1-56592-270-0, published by O'Reilly, pp. 1-15.

* cited by examiner

IDE - SAMPLEPROGRAM.JAVA — 142

200

```
0010   void SampleProgram (String Country) {
0020   Context ctx = new InitialContext();
0030   DataSource ds = (DataSource) ctx.lookup("jdbc/myDB");
0040   Connection con = ds.getConnection("user","pwd");
0050   Statement stmt = con.createStatement(ResultSet.CONCUR_UPDATABLE);
0060   If (Country = "USA") {
0070   ResultSet rs = stmt.executeQuery("select STATE from TBL1");
0080   String sCode = rs.getString("STATE");
0090   }
0100   else {
0110   ResultSet rs = stmt.executeQuery("select COUNTRY, LANGUAGE, REGION from TBL2");
0120   String sCode = rs.getString("COUNTRY");
0130   String lCode = rs.getString("LANGUAGE");
0140   String rCode = rs.getString("REGION");
0150   }
0160   System.out.println ("First Record Code = " + sCode)
0170   con.close
0180   }
```

COVERAGE ANALYSIS TOOL FOR TESTING DATABASE-AWARE SOFTWARE APPLICATIONS

BACKGROUND OF THE INVENTION

1. Field of the Invention

Embodiments of the invention are related to tools used for testing application software. More specifically, embodiments of the invention provide a coverage tool for analyzing database-aware applications.

2. Description of the Related Art

Currently, coverage tools exist for testing software applications. Typical coverage tools analyze the coverage of the program source code of the application during a testing process. That is, they determine which parts of the program source code (e.g., classes, methods, routines, functions, etc.) are used, and are therefore tested, during a given test.

However, current coverage analysis tools do not evaluate the coverage of parts of a database (e.g., tables, columns, rows) that may be accessed while testing the application. For example, if a high percentage of a project's code is being tested, but a high percentage of the database query strings are in the untested source code, the coverage analysis may be misleading. Similarly, coverage analysis does not include analysis of what tables, rows, elements, or attributes are accessed by the database query strings, because the coverage remains unaware of the semantic content of the strings.

Accordingly, as the foregoing discussion illustrates, there remains a need for a coverage analysis tool for testing database-aware applications.

SUMMARY OF THE INVENTION

Embodiments of the invention provide a coverage analysis tool for testing database-aware applications. One embodiment of the invention includes a method for evaluating a software application configured to access a data source. The method may generally include receiving a test case specifying a sequence of actions for the software application to perform, where the software application includes a plurality of program statements. The method may also include executing the software application according to the test case, and, as each program statement of the software application is executed, determining whether any elements of the data source are accessed by a given program statement. For each program statement of the software application that accesses an element of the data source, an indication of the element of the data source accessed by the program statement may be recorded.

Another embodiment of the invention includes a computer-useable storage medium containing a program, which, when executed performs an operation for evaluating a software application configured to access a data source. The operation may generally include receiving a test case specifying a sequence of actions for the software application to perform, where the software application includes a plurality of program statements. The operation may also include executing the software application according to the test case, and as each program statement of the software application is executed, determining whether any elements of the data source are accessed by a given program statement. For each program statement of the software application that accesses an element of the data source, an indication of the element of the data source accessed by the program statement is recorded.

Still another embodiment of the invention includes a system having a data source, a processor, and a memory containing a program, which when executed by the processor, is configured to perform an operation for evaluating a software application configured to access the data source. The program may be generally configured to receive a test case specifying a sequence of actions for the software application to perform, where the software application includes a plurality of program statements. The program may also be configured to execute the software application according to the test case, and as each program statement of the software application is executed, determine whether any elements of the data source are accessed by a given program statement. For each program statement of the software application that accesses an element of the data source, an indication of the element of the data source accessed by the program statement is recorded.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide coverage analysis of elements of a database accessed by a software application. Currently, elements of databases are routinely ignored by coverage analysis tools. Thus, such tools may fail to uncover issues related to data access. For example, database statements in program source code may retrieve data from, or update/insert data into, the database. In the program source code, database statements are usually specified as text strings in a database query language, such as SQL. The following source code fragment illustrates an embedded SQL query using the Java® programming language:

```
public interface get_data {
    // create connection to database
    @select sql= ("select column_A, column_B from database.table");
    // execute sql statement
    // process query results
}
```

Because the query is enclosed within double-quotes, conventional coverage analysis tools treat the database statement as a text string, and ignore whether they are used in a given coverage test. Thus, in determining a proportion of a program source code that is covered, existing tools may present an incorrect and/or misleading picture. Accordingly, in one embodiment, a coverage analysis tool may be configured to monitor elements of a database that are accessed during a run-time test of a software application. For example, the tool may record that the "column_A" and "column_B" elements from "database.table" are accessed by the embedded text query. Further, the coverage analysis tool may be configured to also capture time data for the access to the elements of the database, which may be used to determine performance metrics. Furthermore, the coverage analysis tool may be configured to also determine coverage of the source code of the software application as well as perform a static analysis of a software application, and thus determine elements of a database that can potentially be accessed by the software application. By providing coverage analysis of elements for the database, embodiments of the invention enable more complete testing of database-aware applications.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying storing computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, an embodiment of the invention is described herein relative to a coverage analysis tool for a database-aware software application using the Java® programming language that includes embedded SQL statements. Frequently, an application program interface (API) may provide a set of functions used to connect to and access a database. For example, the well known JDBC specification (Java Database Connectivity) provides an API specification for connecting programs written in Java® to data in popular databases. The JDBC API allows a developer to encode an access request statement in SQL that is then passed to the program that manages the database. Statement results may be returned through a similar interface.

One of ordinary skill in the art will readily recognize, however, that embodiments of the invention may be adapted for use with a wide variety of programming languages that allow database statements to be embedded within program source code. Similarly, embodiments of the invention may be adapted for use with other database query languages.

Figure 1:
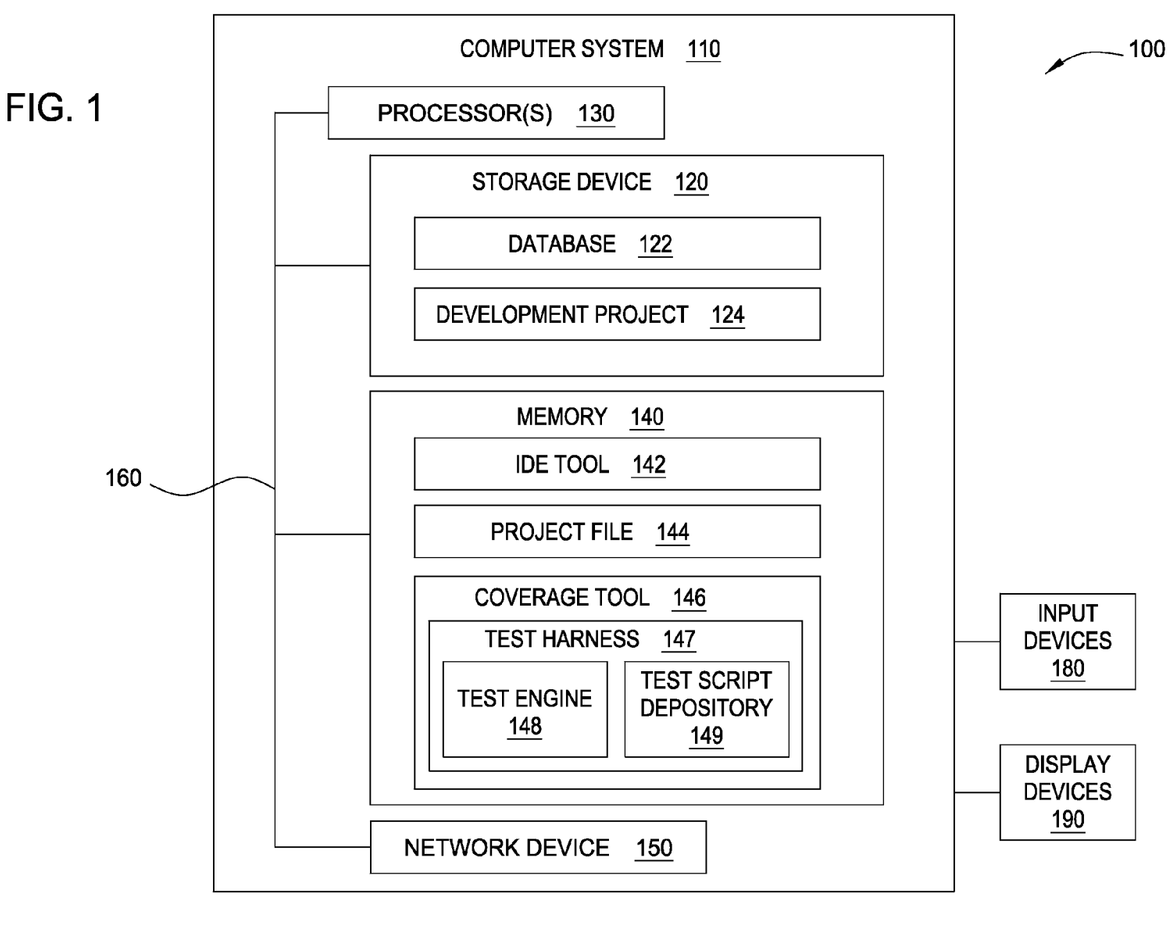
FIG. 1 illustrates an exemplary computing system, according to one embodiment of the invention.

FIG. 1 is a block diagram that illustrates an example view of a computing environment 100, according to one embodiment of the invention. As shown, computing environment 100 includes computer system 110. Computer system 110 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 110 is simplified to highlight aspects of the present invention and that computing systems and data communication networks typically include a variety of additional elements not shown in FIG. 1.

As shown, computer system 110 includes a processor (or processors) 130, a storage device 120, a network device 150, and a memory 140, all connected by a bus 160. Processor 130 is a programmable logic device that executes user applications (e.g., an IDE tool 142). Computer system 110 may be connected to a display device 190 and one or more input devices 180. Typically, user input devices 180 include a mouse pointing device and a keyboard, and display device 190 is a CRT monitor or LCD display. The processing activity and hardware resources on computer system 110 may be managed by an operating system (not shown). Well known examples of operating systems include the Windows® operating system, distributions of the Linux® operating system, and IBM's AIX and OS/2® operating systems, among others.

(Linux is a trademark of Linus Torvalds in the US, other countries, or both). Network device 150 may connect computer system 110 to any kind of data communications network, including both wired and wireless networks.

Storage device 120 stores application programs and data for use by computer system 110. Typical storage devices include hard-disk drives, flash memory devices, optical media, network and virtual storage devices, and the like. As shown, storage device 120 contains a database 122 and a development project 124. Database 122 may store a collection of data records organized according to a relational schema (e.g., a database having a structure of tables, columns, and keys for organizing data), and may be accessed using SQL database statements. The components of the database schema are hereafter referred to as database elements. Development project 124 represents a collection of information used to build a software application. For example, development project 124 may include source code files, scripts, etc., along with resources such as fonts, images, build-instructions, and project documentation, etc.

In one embodiment, memory 140 includes an IDE tool 142, a project file 144, and a coverage tool 146. IDE tool 142 provides a programming environment that assists a computer programmer in developing software. IDE tool 142 may include of a source code editor, a compiler and/or interpreter, build-automation tools, and a debugger (not shown). Other components provided by IDE tool 142 may include a version control system, a class browser, an object inspector and, a class hierarchy diagram generator, etc.

Project file 144 represents a file included in development project 124 that is being edited by a developer using IDE tool 142, e.g., a source code file of a database-aware software application. IDE tool 142 may display the text of the source code to the developer on display device 190 and provide an interface that allows the user to edit project file 144. One embodiment of IDE 142 is illustrated in FIG. 2.

Figure 2:
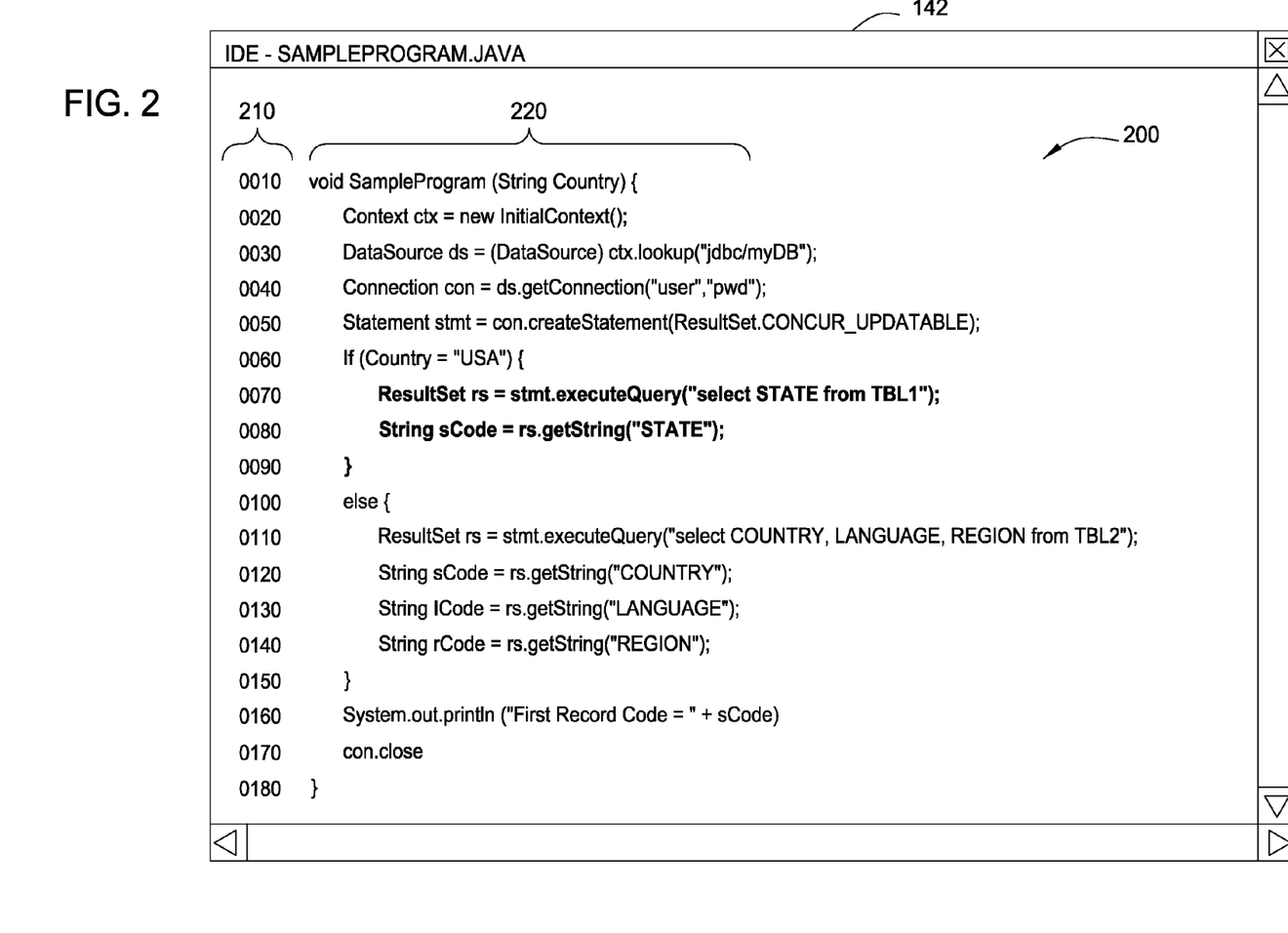
FIG. 2 illustrates an exemplary IDE displaying source code, according to one embodiment of the invention.

FIG. 2 illustrates an exemplary IDE 142 displaying source code 200, according to one embodiment of the invention. As shown, source code 200 is displayed with a set of line numbers 210 and a set of program statements 220 for a Java program named "SampleProgram," which may represent project file 144. Lines 0030 and 0040 are program statements that open a database connection "con" to the database "myDB." The connection "con" is closed by the program statement in line 0170.

As shown, line 0060 includes an "IF" condition, and line 0100 includes an "ELSE" condition. These conditions act to create two logical branches in the source code 200, meaning that there are two paths which the execution of the program may follow. One logical path is made up of the statements included in lines 0070 to 0090 (shown in bold font), and is followed only if the condition "Country='USA'" is true. In this logical path, the database statement included in line 0070 reads data from column STATE of table TBL1. On the other hand, if the condition "Country='USA'" is not true, the program execution follows a second logical path comprising lines 0110 to 0150. In this second logical path, the database statement included in line 0110 reads data from columns COUNTRY, LANGUAGE, and REGION of table TBL2. Note that, in the situation where only the first logical path is executed during a test, conventional coverage tools may indicate a coverage of 50%, meaning that half of source code 200 was covered (i.e., one of two logical paths was executed). However, this outcome may present a misleading picture regarding coverage of database columns, since the first logical path only accessed data from one database column (i.e., STATE) out of the four database columns that are potentially accessed by source code 200. That is, while 50% of the code statements may be tested by following the "Country==USA" branch, only one column of one table of the database is accessed in this branch.

Referring again to FIG. 1, coverage tool 146 may provide analysis of the coverage of elements of a database that are accessed by a software application. For example, coverage tool 146 may be used to determine which database elements of database 122 are accessed during a coverage test. Accordingly, coverage tool 146 may be configured to evaluate database statements according to a set of rules for a given query language (e.g., SQL), and to determine any database elements referenced in the database statement. For example, a database-aware application may include database statements to create records, retrieve records, update records, and delete records from a given database. Such database statements include references to database elements (e.g., tables, columns, rows, and the like) that are added, modified, deleted, etc. Alternatively, coverage tool 146 may be configured to determine which database elements are accessed by a software application by using other suitable methods, for example monitoring query requests received by database 122.

In one embodiment, coverage tool 146 may be configured to perform a static analysis to determine all database elements that could potentially be accessed by the software application. That is, coverage tool 146 may determine the logical paths defined by the source code of the application (e.g., the logical path defined by lines 0070 to 0090 in FIG. 2), and determine any database elements that are accessed within the logical paths. In such a case, coverage tool 146 may be configured to parse source code statements, to identify branching points (e.g., conditional statements, subroutine calls, etc.) in the control flow of the program, to follow the resulting logical paths, and to determine any database elements accessed therein. This embodiment is discussed further below with reference to FIG. 3.

In another embodiment, coverage tool 146 may be configured to perform a run-time analysis to determine any database elements actually accessed during a test of the software application. For example, coverage tool 146 may monitor access to elements of database 122 during an execution of the project file 144. In such a case, coverage tool 146 may be configured to execute the software application according to a predefined set of test instructions (i.e., a test case), and to determine the database elements accessed during execution of each test instruction.

In one embodiment, coverage tool 146 may include a test harness 147 configured to test a program unit (i.e., project file 144) by executing the program unit under varying conditions and monitor its behavior and outputs. Test harness 147 allows the testing process to be automated. As the program being tested interacts with a database, e.g., by creating a connection, submitting a query, and processing query results, test harness 147 may be configured to record various running totals of content accessed and manipulated, which it processes after the tests have run and calculates various useful statistics.

Illustratively, test harness 147 includes a test engine 148 and a test script repository 149. The test engine 148 may be configured to call functions of the program being tested with supplied parameters, according to a given test script in test script repository 149. The test engine 148 may also store and report results of program execution, as well as indicate which portions of a program were executed as part of a given test. Further, test engine 148 may identify which portions of a database were accessed by a program during a given test. For example, using the program source code illustrated in FIG. 2, a test script that only tested the "Country==USA" branch of source code 200, could report that the COUNTY, LANGUAGE, and REGION columns of TBL2 were not covered by such a test script.

The coverage tool 146 may be configured to interact with the database 122 to gather other information necessary to form inductions about a given database statement passed from a software application being tested by coverage tool 146. For example, coverage tool 146 may record semantic information about the database statements to expose metadata about tables, views, columns, or triggers affected by each statement, and also to expose metadata about code used to execute these statements, such as packages, classes, methods, and line numbers. Thus, unlike existing code coverage solutions, embodiments of the invention may be used to execute test cases to determine whether the operation of the program is correct and/or complete in terms of program output, but also in terms of database operations, state changes, logs and trace results. The coverage tool may be configured to identify the specific classes, files, methods, and lines of code executed not only in terms of the programming language (e.g., Java), but in terms of the database query language (e.g. SQL) as well. In one embodiment, the coverage tool may determine a coverage percentage not only in comparison to total code, but to the known database query language statements embedded within the program source code.

Optionally, coverage tool 146 may also be configured to determine starting and ending time stamps for each access of database elements. The starting and ending time stamps may be used to generate metrics measuring the performance of the software application. Additionally, coverage tool 146 may be configured to provide coverage analysis of elements of source code of the application being tested. Coverage tool 146 may perform the above functions by any suitable techniques, for example code instrumentation. This embodiment is discussed further below with reference to FIG. 4.

The coverage data collected by coverage tool 146 may be stored for later use, for instance in metadata included in development project 124, or in database 122. The coverage data may also be summarized as coverage metrics, which generally indicate a proportion of all database elements that are accessed during a test (or series of tests). Coverage metrics may be presented to a user of coverage tool 146 after testing project file 144. An example of a user display including coverage metrics is discussed further below with reference to FIG. 5.

Additionally, coverage metrics may be used for other functions, for instance to identify portions of the source code and/or the database that may be changed to improve performance. Further, coverage metrics may be used to evaluate security aspects of the software application. For example, the coverage of database elements may be used to determine if security-restricted portions of a database are being improperly accessed.

Of course, the above description of coverage tool 146 is provided for illustrative purposes, and is not intended to be limiting of the scope of the invention. Other embodiments are also contemplated. In one example, functionality described above as part of coverage tool 146 may be implemented as separate components working as a system.

Figure 3:
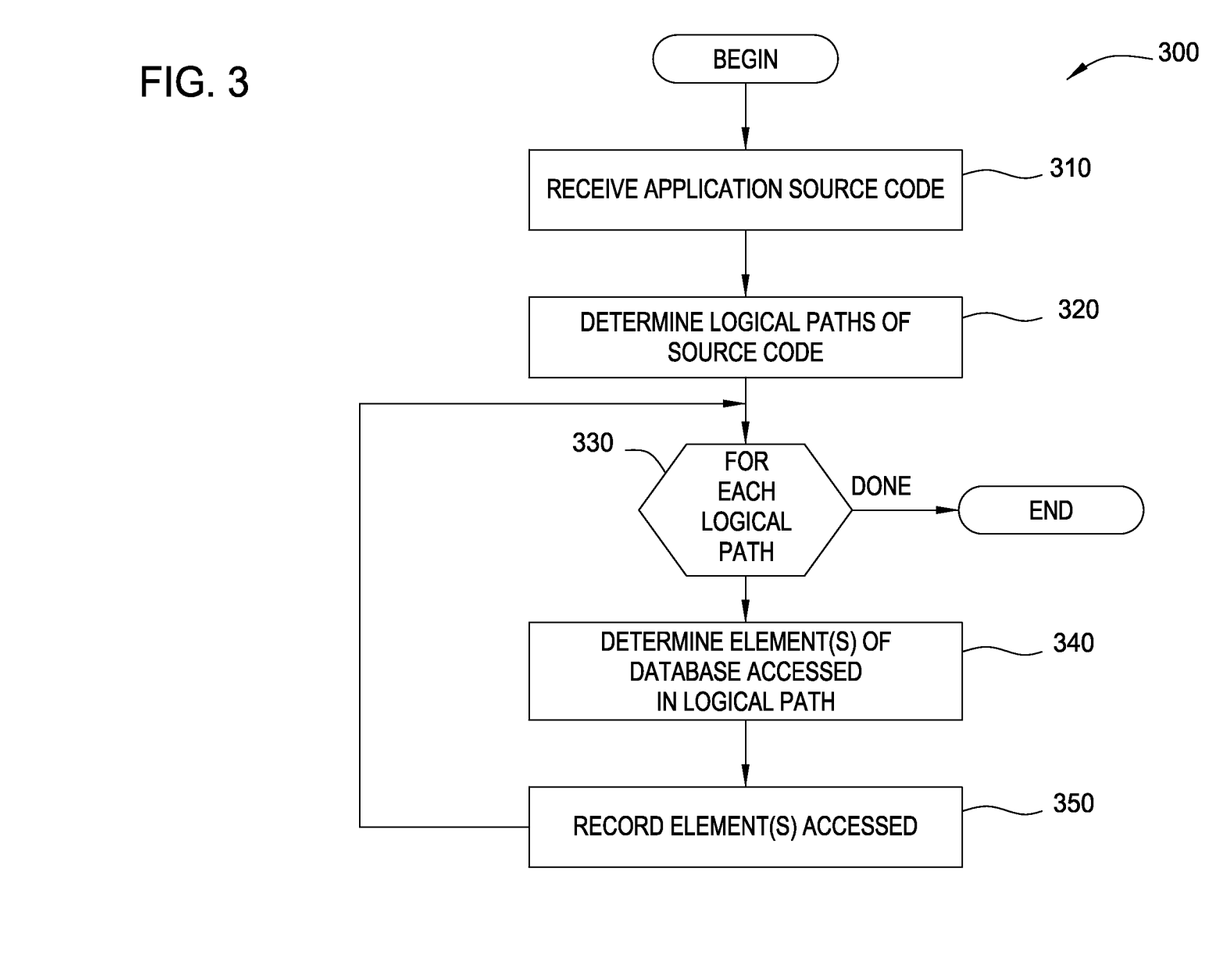
FIG. 3 illustrates a method for determining coverage of elements of a database using static analysis, according to one embodiment of the invention.

FIG. 3 illustrates a method 300 for determining coverage of elements of a database using static analysis, according to one embodiment of the invention. Persons skilled in the art will understand that, even though the method is described in conjunction with the system of FIG. 1, any system configured to perform the steps of method 300, in any order, is within the scope of the present invention.

As shown, method 300 begins at step 310, where source code of a software application is received. For example, a user of coverage tool 146 may select project file 144 for coverage analysis. At step 320, the logical paths defined by the source code are determined. For example, coverage tool 146 may determine the logical path defined by lines 0070 to 0090 illustrated in FIG. 2. At step 330, the method 300 enters a loop (defined by steps 330, 340, and 350) for processing each logical path determined at step 320. At step 340, any elements of the database that are accessed within the logical branch are determined. For example, assuming the logical path defined by lines 0070 to 0090 (illustrated in FIG. 2), the column STATE and the table TBL1 may be determined at step 340. At step 350, the elements of the database determined at step 340 may be recorded. Once all logical paths are completed at step 330, the method 300 terminates.

Figure 4:
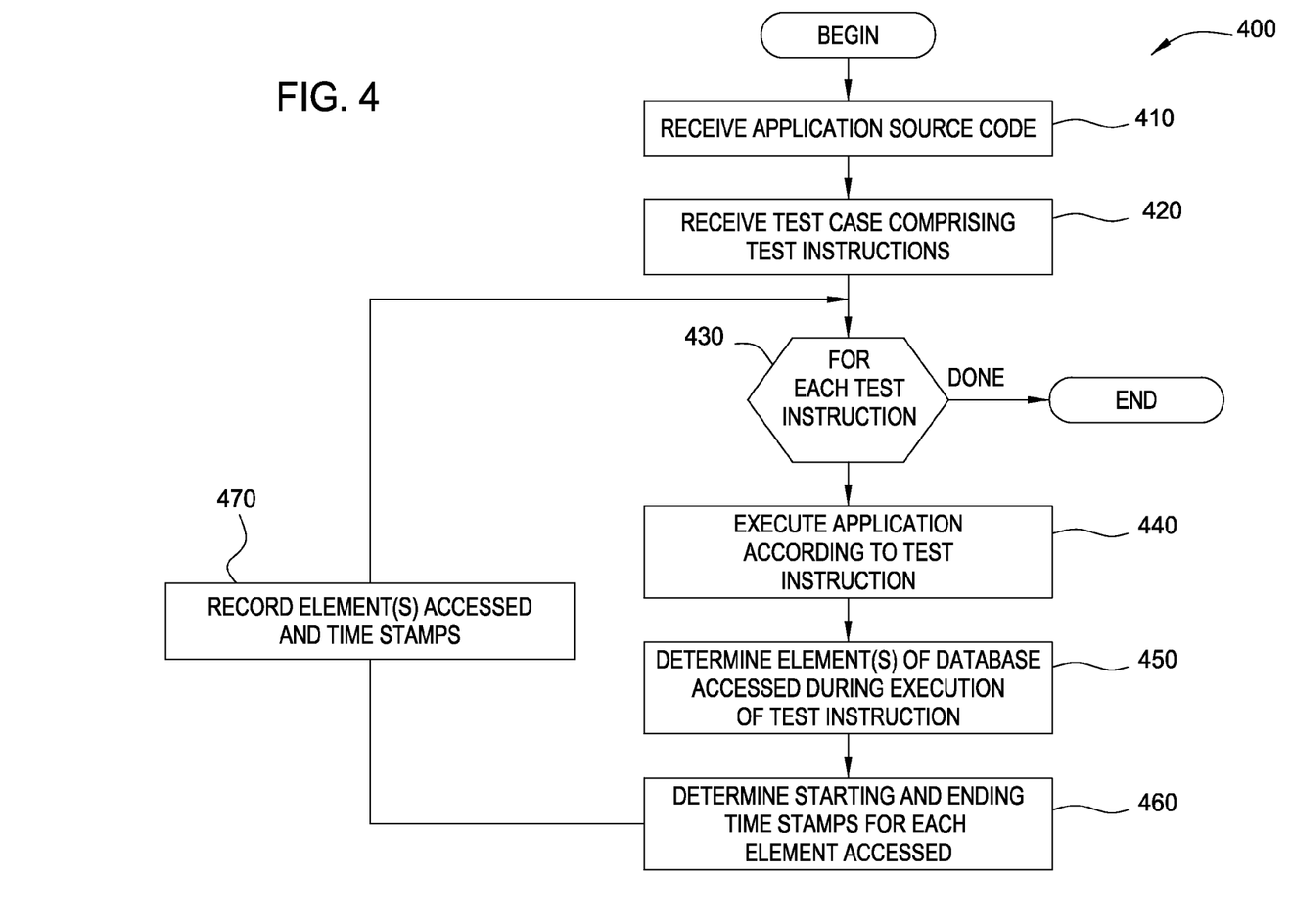
FIG. 4 illustrates a method for determining coverage of elements of a database using run-time analysis, according to one embodiment of the invention.

FIG. 4 illustrates a method 400 for determining coverage of elements of a database using run-time analysis, according to one embodiment of the invention. The steps of method 400 may be performed, for example, by coverage tool 146 illustrated in FIG. 1. Of course, persons skilled in the art will understand that, even though the method is described in conjunction with the system of FIG. 1, any system configured to perform the steps of method 400, in any order, is within the scope of the present invention.

As shown, method 400 begins at step 410, where source code of a software application is received. At step 420, a test case for testing the software application may be received. The test case may include a set of test instructions for performing the software application, and may be configured to test certain elements of the source code of the software application. At step 430, the method 400 enters a loop (defined by steps 430, 440, 450, 460 and 470) for processing each test instruction included in the received test case. At step 440, the software application is executed according to the test instruction.

At step 450, any elements of the database that are accessed during execution of the test instruction are determined. For example, assuming a test instruction to read values of a database column, that column may be determined at step 450. At step 460, a starting time and an ending time for accessing the elements of the database the elements may be determined. These times may be used, for example, to calculate performance metrics for the software application. At step 470, the elements of the database determined at step 450 and the starting and ending times determined at step 460 may be recorded. Once all test instructions are completed at step 430, the method 400 terminates. The steps of method 400 may be performed, for example, by coverage tool 146 illustrated in FIG. 1.

Figure 5:
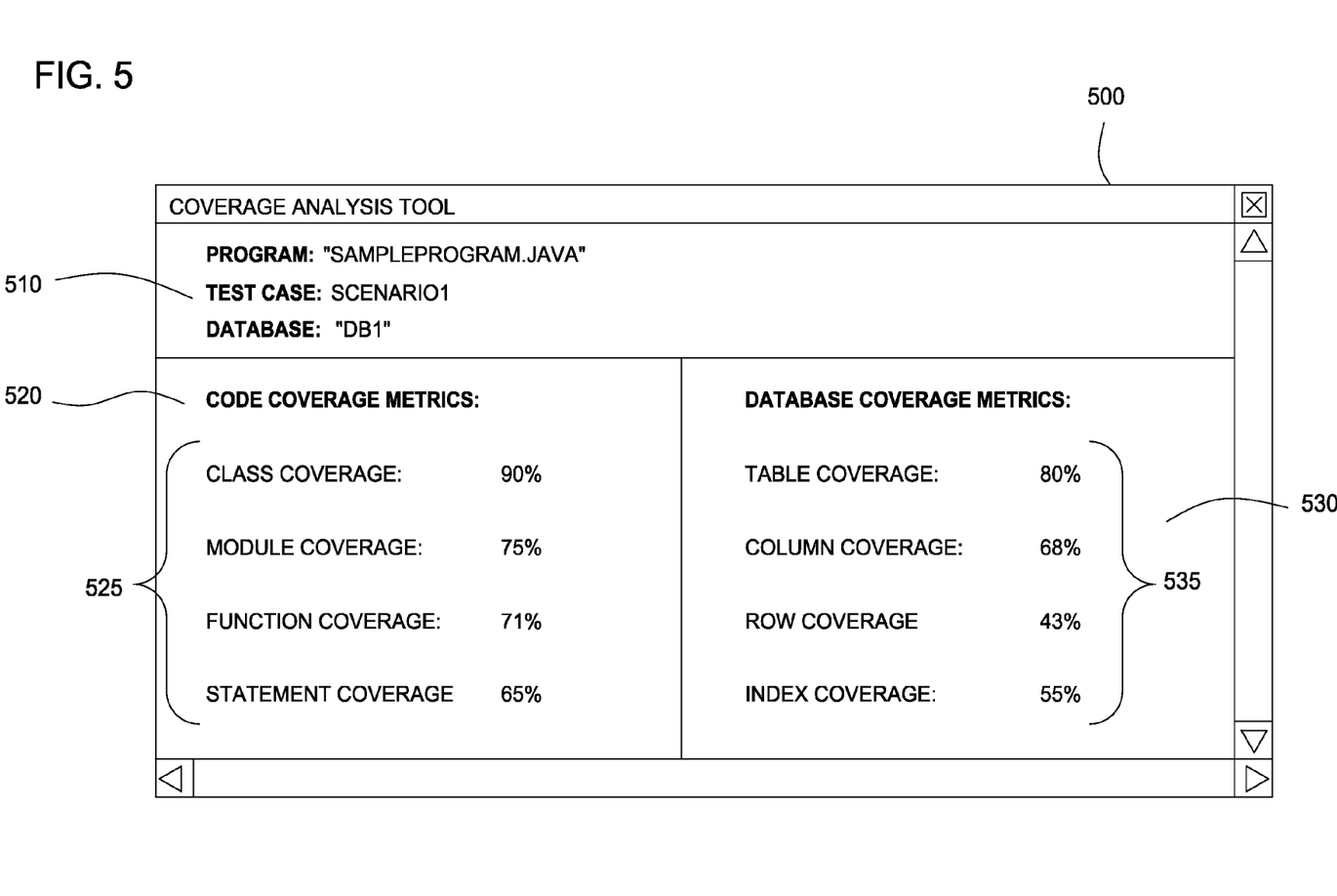
FIG. 5 illustrates a screenshot from an exemplary coverage tool displaying coverage metrics, according to one embodiment of the invention.

FIG. 5 illustrates a screenshot 500 from an exemplary coverage tool displaying coverage metrics, according to one embodiment of the invention. Generally, the coverage metrics displayed in screenshot 500 may be used to evaluate the completeness of testing of a database-aware software application (e.g., project file 144). As shown, screenshot 500 includes a header section 510, a code coverage section 520, and a database coverage section 530. Header section 510 includes a program name "SAMPLEPROGRAM.JAVA," indicating the name of project file 144 being evaluated by coverage tool 146. Header section 510 also includes a test case name "SCENARIO1," indicating a particular set of test instructions that may be applied to project file 144 by coverage tool 146. Header section 510 also includes a database name "DB1," indicating the name of database 122 which may be accessed by project file 144.

As shown, code coverage section 520 includes code coverage metrics 525 corresponding to various elements of the source code of project file 144. That is, code coverage metrics 525 describe the proportions of classes, modules, functions, and statements included in project file 144 that were accessed during the test case "SCENARIO1." Database coverage section 530 includes database coverage metrics 535 corresponding to various elements of database 120. That is, database coverage metrics 535 describe the proportions of tables, columns, rows, and indexes of database 122 that were accessed by project file 144 during the test case "SCENARIO1."

Advantageously, embodiments of the invention provide coverage analysis of database elements accessed by a software application. Currently, database elements are routinely ignored by coverage tools, resulting in incomplete pictures of the overall performance and reliability of the software application. By providing coverage analysis of database elements as well as source code elements, embodiments of the invention enable improved and more complete testing of database-aware applications While the foregoing is directed to embodiments of the present invention, other and further embodiments of the invention may be devised without departing from the basic scope thereof, and the scope thereof is determined by the claims that follow.

What is claimed is:

1. A computer-implemented method for evaluating a software application configured to access a database, the method comprising:
   receiving a test case specifying a sequence of actions for the software application to perform, wherein the software application includes a plurality of program statements;
   executing, by operation of one or more computer processors, the software application according to the test case; and
   for each program statement of the software application determined to access one or more elements of the database, recording an indication of the elements of the database accessed by the program statement, wherein determining whether any elements of the database are accessed by a given program statement comprises identifying a relational database query embedded as a text-string in the given program statement.

2. The computer-implemented method of claim 1, further comprising:
   determining a starting time and an ending time for each program statement that accesses an element of the database; and
   recording the starting time and the ending time.

3. The computer-implemented method of claim 1, further comprising:
   recording an indication of each program statement of the software application executed as part of the sequence of actions specified by the test case.

4. The computer-implemented method of claim 1, further comprising:
   determining that one of the program statements of the software application is configured to access a security-restricted element of the database; and
   recording an indication of the security-restricted element of the database accessed by the program statement.

5. The computer-implemented method of claim 1, wherein the database is a relational database.

6. The computer-implemented method of claim 5, further comprising determining a coverage percentage of elements of the database accessed by the application software.

7. The computer-implemented method of claim 5, wherein an element of the database comprises at least one of a database table, a column, an index, and a trigger.

8. The computer-implemented method of claim 1, wherein the test case includes a set of test parameters supplied to the software application.

9. A computer-useable storage medium containing a program, which, when executed, performs an operation for evaluating a software application configured to access a database, the operation comprising:
   receiving a test case specifying a sequence of actions for the software application to perform, wherein the software application includes a plurality of program statements;
   executing the software application according to the test case; and
   for each program statement of the software application determined to access one or more elements of the database, recording an indication of the elements of the database accessed by the program statement, wherein determining whether any elements of the database are accessed by a given program statement comprises identifying a relational database query embedded as a text-string in the given program statement.

10. The computer-useable storage medium of claim 9, wherein the operation further comprises:
    determining a starting time and an ending time for each program statement that accesses an element of the database; and
    recording the starting time and the ending time.

11. The computer-useable storage medium of claim 9, wherein the operation further comprises:
    recording an indication of each program statement of the software application executed as part of the sequence of actions specified by the test case.

12. The computer-useable storage medium of claim 9, wherein the operation further comprises:
    determining that one of the program statements of the software application is configured to access a security-restricted element of the database; and
    recording an indication of the security-restricted element of the database accessed by the program statement.

13. The computer-useable storage medium of claim 9, wherein the database is a relational database.

14. The computer-useable storage medium of claim 13, wherein the operation further comprises determining a coverage percentage of elements of the database accessed by the application software.

15. The computer-useable storage medium of claim 13, wherein an element of the database comprises at least one of a database table, a column, an index, and a trigger.

16. The computer-useable storage medium of claim 9, wherein the test case includes a set of test parameters supplied to the software application.

17. A system comprising:
    a database;
    a processor; and
    a memory containing a program, which, when executed by the processor, is configured to perform an operation for evaluating a software application configured to access the database, by performing the steps of:
    receiving a test case specifying a sequence of actions for the software application to perform wherein the software application includes a plurality of program statements;
    executing the software application according to the test case; and for each program statement of the software application determined to access one or more elements of the database, recording an indication of the elements of the database accessed by the program statement, wherein determining whether any elements of the database are accessed by a given program statement comprises identifying a relational database query embedded as a text-string in the given program statement.

18. The system of claim 17, wherein the steps further comprise:
   determining a starting time and an ending time for each program statement that accesses an element of the database; and
   recording the starting time and the ending time.

19. The system of claim 17, wherein the steps further comprise:
   determining that one of the program statements of the software application is configured to access a security-restricted element of the database; and
   recording an indication of the security-restricted element of the database accessed by the program statement.

20. The system of claim 17, wherein the database is a relational database.

21. The system of claim 20, wherein the steps further comprise determining a coverage percentage of elements of the database accessed by the application software.

22. The system of claim 20, wherein an element of the database comprises at least one of a database table, a column, an index, and a trigger.

\* \* \* \* \*